US009391497B2

(12) United States Patent
Ramsingh (10) Patent No.: US 9,391,497 B2
(45) Date of Patent: Jul. 12, 2016

(54) ELECTRIC MOTORS HAVING MODULAR CONSTRUCTION, POWER SHARING AND PERFORMANCE CONFIGURABILITY (71) Applicant: Trane International Inc., Piscataway, NJ (US)

(72) Inventor: Mark Ramsingh, Macon, GA (US)

(73) Assignee: TRANE INTERNATIONAL INC., Piscataway, NJ (US)

(*) Notice: Subject to any disclaimer, the term of this patent is extended or adjusted under 35 U.S.C. 154(b) by 162 days.

(21) Appl. No.: 14/244,780

(22) Filed: Apr. 3, 2014

(65) Prior Publication Data
US 2014/0300295 A1 Oct. 9, 2014

Related U.S. Application Data (60) Provisional application No. 61/808,026, filed on Apr. 3, 2013, provisional application No. 61/808,023, filed on Apr. 3, 2013, provisional application No. 61/808,020, filed on Apr. 3, 2013, provisional application No. 61/808,036, filed on Apr. 3, 2013.

(51) Int. Cl.
H02P 1/54 (2006.01)
H02P 5/00 (2006.01)
H02P 5/46 (2006.01)
H02K 15/00 (2006.01)
H02K 11/00 (2016.01)
H02P 6/00 (2016.01)
G05B 19/00 (2006.01)
H02K 5/22 (2006.01)

(52) U.S. Cl.
CPC ............... *H02K 15/00* (2013.01); *G05B 19/00* (2013.01); *H02K 5/225* (2013.01); *H02K 11/0068* (2013.01); *H02K 11/0073* (2013.01); *H02K 11/30* (2016.01); *H02K 11/33* (2016.01); *H02K 11/35* (2016.01); *H02P 5/00* (2013.01); *H02P 6/001* (2013.01); *H02K 11/0078* (2013.01); *H02K 2213/09* (2013.01); *H02K 2213/12* (2013.01)

(58) Field of Classification Search
CPC ...................................................... H02K 15/00
USPC .............................................................. 318/51
See application file for complete search history.

(56) References Cited

U.S. PATENT DOCUMENTS

| 5,994,869 | A  | 11/1999 | Becerra |
| 6,895,176 | B2 | 5/2005  | Archer et al. |
| 7,049,786 | B1 | 5/2006  | Toliyat et al. |
| 7,888,922 | B2 | 2/2011  | Melanson |
| 8,264,182 | B2 | 9/2012  | Ramu |
| 8,550,388 | B2 | 10/2013 | Donaldson et al. |
| 8,619,442 | B2 | 12/2013 | Wrathall |

(Continued)

*Primary Examiner* — Erick Glass
(74) *Attorney, Agent, or Firm* — Taft Stettinius & Hollister LLP (57) ABSTRACT Modular motor apparatuses, systems and methods are disclosed. Certain embodiments comprise a motor core and driver module a power supply module, and an external interface module. Families of these modules may utilize a standardized communication protocol to enhance flexibility, upgradeability, and serviceability in the configuration of the motor apparatus. Certain embodiments comprise a power sharing system in which a power supply module serves two or more motor core and driver modules. Certain embodiments comprise a motor performance configuration module including an integrated or remote user interface. The user interface is configured to allow a high reliability graphical performance configuration and scaling of motor performance without the use of a computer on the motor.

35 Claims, 3 Drawing Sheets

(56) References Cited

U.S. PATENT DOCUMENTS

| | | |
|---|---|---|
| 8,829,865 B2 | 9/2014 | Domb |
| 2006/0018764 A1* | 1/2006 | Schnetzka ............... F04C 29/06 417/44.1 |
| 2008/0115512 A1* | 5/2008 | Rizzo ................. B60H 1/00428 62/134 |
| 2011/0068723 A1 | 3/2011 | Maiocchi |
| 2013/0026962 A1 | 1/2013 | Becerra et al. |
| 2013/0167752 A1* | 7/2013 | Barbee ..................... B60L 7/24 105/1.4 |

* cited by examiner

ELECTRIC MOTORS HAVING MODULAR CONSTRUCTION, POWER SHARING AND PERFORMANCE CONFIGURABILITY

CROSS-REFERENCE TO RELATED APPLICATIONS

This application claims the benefit of Provisional Application No. 61/808,026 filed Apr. 3, 2013, Provisional Application No. 61/808,023 filed Apr. 3, 2013, Provisional Application No. 61/808,020 filed Apr. 3, 2013, and Provisional Application No. 61/808,036 filed Apr. 3, 2013, each of which is incorporated herein by reference.

TECHNICAL FIELD

The present application relates to electric motors, and more particularly, but not exclusively to electric motors having a modular construction, power sharing apparatuses, systems and methods that distribute power to multiple motors, and an interface apparatus and method for motor performance configuration.

BACKGROUND

Electric motors such as variable speed brushless DC (BLDG) motors and electronically communicated (EC) motors, and the structure and manner for providing modularity of such motors, remains an area of interest. Systems employing multiple motors for example multiple AC powered brushless DC motors, and the structure and manner for distributing power to such motors and managing and regulating such motors, also remains an area of interest. The performance configuration of motors, separate motors and drive combinations, and integrated drive combinations, and the structure and manner for providing such performance configuration, also remains an area of interest.

Some existing systems and methods have various shortcomings, drawbacks, and disadvantages relative to certain applications. Accordingly, there remains a need for further contributions in this area of technology.

SUMMARY

One embodiment of the present invention is a unique motor apparatus in which a motor core and driver module, a power supply module, and an external interface module are configured as separate families to allow flexibility, upgradeability, and or serviceability, in the configuration of the motor apparatus. Other embodiments include apparatuses, systems, devices, hardware, methods, and combinations for modular construction of a motor apparatus. Further embodiments, forms, features, aspects, benefits, and advantages of the present application shall become apparent from the description and figures provided herewith.

Another embodiment of the present invention is a unique multiple motor power sharing system including a plurality of motors, in which two or more DC motor drive systems can be used, wherein not all motors have an AC to DC power circuit such as a rectifier or other AC/DC converter. Certain exemplary embodiments include a master motor regulator that is configured such that the other motors can continue to operate for example at full power while the master motor (or other select motors') power output is sacrificed; or additionally and/or alternatively, such that the auxiliary motors' output power is sacrificed while the master motor (or other motors') power is maintained. Other embodiments include apparatuses, systems, devices, hardware, methods, and combinations for distributing power to such motors and managing and regulating such motors.

Another embodiment of the present invention is a unique motor performance configuration module including an integrated or remote user interface configured to allow a high reliability graphical performance configuration and scaling of motor performance without the use of a computer on the motor. Other embodiments include apparatuses, systems, devices, hardware, methods, and combinations for performance configuration of motors.

According to one aspect, a kit comprises a plurality of motor core and driver modules including at least two motor core and driver modules with different electrical characteristics; a plurality of power supply modules including at least two power supply modules with different electrical characteristics; and a plurality of external interface modules including at least two external interface modules with different electrical characteristics; wherein the motor core and driver modules, the power supply modules, and the external interface modules are structured to be selectably coupleable with one another to provide a plurality of different assemblies, each of the plurality of different assemblies comprising a common set of electrical interconnection including a first electrical interconnection between the power supply module and the motor core and driver module of each assembly, a second electrical interconnection between the external interface module and the motor core and driver module of each assembly, and a third electrical interconnection between the power supply module and the external interface module of each assembly, wherein the voltage of the first electrical interconnection is greater than the voltage of the second electrical interconnection.

In an embodiment, the kit further comprises an electric motor coupled with the motor core and driver module of at least one of the assemblies.

In an embodiment, the plurality of motor core and driver modules comprises modules having different horsepowers.

In an embodiment, the plurality of motor core and driver modules are configured with circuitry for converting DC power supply and power request signals into drive signals for driving the motor core in different modes of operations and rotational directions.

In an embodiment, the plurality of power supply modules are structured to convert AC single and poly phase into DC voltage.

In an embodiment, the first low voltage interconnection of each assembly is structured to transfer proportional torque or speed information and rotational direction information between the external interface module and the motor core and driver module of each assembly.

In an embodiment, the second low voltage interconnection is structured to transfer power line input information between the power supply module and the external interface module of each assembly.

In an embodiment, one of the assemblies is configured to provide a first set of mechanical functions, and another of the assemblies is configured to incorporate another, different, set of mechanical functions.

In an embodiment, the kit comprises a first motor drivably coupled with a first one of the assemblies; a second motor drivably coupled with a second one of the assemblies; and a third motor drivably coupled with a third one of the assemblies; and at least two of the first, second and third assemblies utilize a common power supply module.

In an embodiment, the voltage of the first electrical interconnection is greater than the voltage of the third electrical interconnection.

In an embodiment, the third electrical interconnection comprises a multi-tap interface.

In an embodiment, the voltage of the first electrical interconnection is at least two times the voltage of the second electrical interconnection.

In an embodiment, the second and third electrical interconnection are class 2 electrically isolated interconnections.

According to another aspect, a multiple motor power sharing system comprises a plurality of motors, wherein at least one of the motors includes a motor drive system and an AC to DC power circuit, and at least another one of the motors includes a motor drive system but not an AC to DC power circuit; wherein the plurality of motors are configured to share power from the AC to DC power circuit of the at least one of the motors including the AC to DC power circuit; wherein at least one of the motors includes drive electronics configured to regulate the AC to DC power circuit to distribute the shared power to the plurality of motors, and wherein at least one of the motors are configured to run at a reduced voltage to maintain full power output while the remaining motors incur a drop off in power.

In an embodiment, each motor drive system includes a motor core and a driver section.

In an embodiment, the plurality of motors includes a master motor and at least one auxiliary motor, wherein the drive electronics are configured to regulate the AC to DC power circuit to sacrifice power to the master motor in order to maintain power to the at least one auxiliary motor or to sacrifice power to the at least one auxiliary motor in order to maintain power to the master motor.

In an embodiment, multiple motor power sharing system further includes a DC buss, and wherein the AC to DC power circuit is configured to supply the shared power to the plurality of motors via the DC buss.

In an embodiment, a plurality of motors each include an AC to DC power circuit, and are attached to the DC buss, and wherein at least one of the motors is configured to receive power from two or more AC to DC power circuits.

In an embodiment, the drive electronics are configured to regulate the AC to DC power circuit up to a predetermined current limit at which the AC to DC power circuit supplies power at a constant level to the DC buss.

In an embodiment, the drive electronics are configured to maintain power until a predetermined voltage drop is experienced, then to reduce output power.

In an embodiment, the drive electronics are configured to regulate one or more of the plurality of motors such that if there is a reduction in a target buss voltage, the drive electronics increases current draw to maintain power output of the one or more of the plurality of motors.

In an embodiment, the plurality of motors are configured to have different power prioritization.

In an embodiment, the plurality of motors includes a first motor having a first priority and a second motor having a second priority, and further including a motor control PWM module configured to manage the power prioritization.

In an embodiment, the plurality of motors includes a blower motor, a condenser motor, and a draft inducer motor, wherein the blower motor includes the motor drive system and the AC to DC power circuit, and the draft inducer motor and the condenser motor each include a motor drive system and are configured to be powered off the AC to DC power circuit of the blower motor; wherein the draft inducer motor is configured to have a power output having a greater power prioritization function than the power output of the blower motor.

In an embodiment, the blower motor is configured to be calibrated to begin a power take-down ahead of the draft inducer motor.

According to an aspect, a motor apparatus includes a motor; a performance configuration module selectively attachable to the motor, the performance configuration module including a user interface configured with one or more input devices for adjusting the performance parameters of the motor; and a controller for processing configuration performance instructions provided by the input devices.

In an embodiment, performance parameters are stored in a microprocessor memory.

In an embodiment, the input devices comprise one or more of switches, encoders, potentiometers, buttons, and input connectors.

In an embodiment, the performance parameters comprise one or more of motor speed, torque, variable speed operating ranges, and rotational direction.

In an embodiment, the performance configuration module is configured to be separable from the motor and extended with a cable.

In an embodiment, the performance configuration module further includes a momentary switch configured to confirm one or more of the settings of the input devices.

In an embodiment, the momentary switch is configured to allow input device changes when set, and to reject input device changes when not set.

In an embodiment, the momentary switch is configured to determine whether a setting can be accepted by the controller.

In an embodiment, the performance configuration module includes an indicator configured to indicate whether the internal configuration of the controller matches the configuration of the input devices.

In an embodiment, the motor apparatus further includes an auxiliary motor, and wherein the performance configuration module is configured to adjust the performance parameters of the auxiliary motor.

In an embodiment, the performance configuration module is configured to communicate with the motor and other motor apparatuses via a group of signals having a predetermined format.

In an embodiment, the group of signals facilitate a proportional operation.

In an embodiment, the proportional operation comprises one or more of proportional speed mode or proportional torque mode.

Further embodiments, forms, features, aspects, benefits, and advantages of the present application shall become apparent from the description and figures provided herewith.

BRIEF DESCRIPTION OF THE FIGURES

Features of the application will be better understood from the following detailed description when considered in reference to the accompanying drawings, in which.

DETAILED DESCRIPTION OF REPRESENTATIVE EMBODIMENTS

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 1:
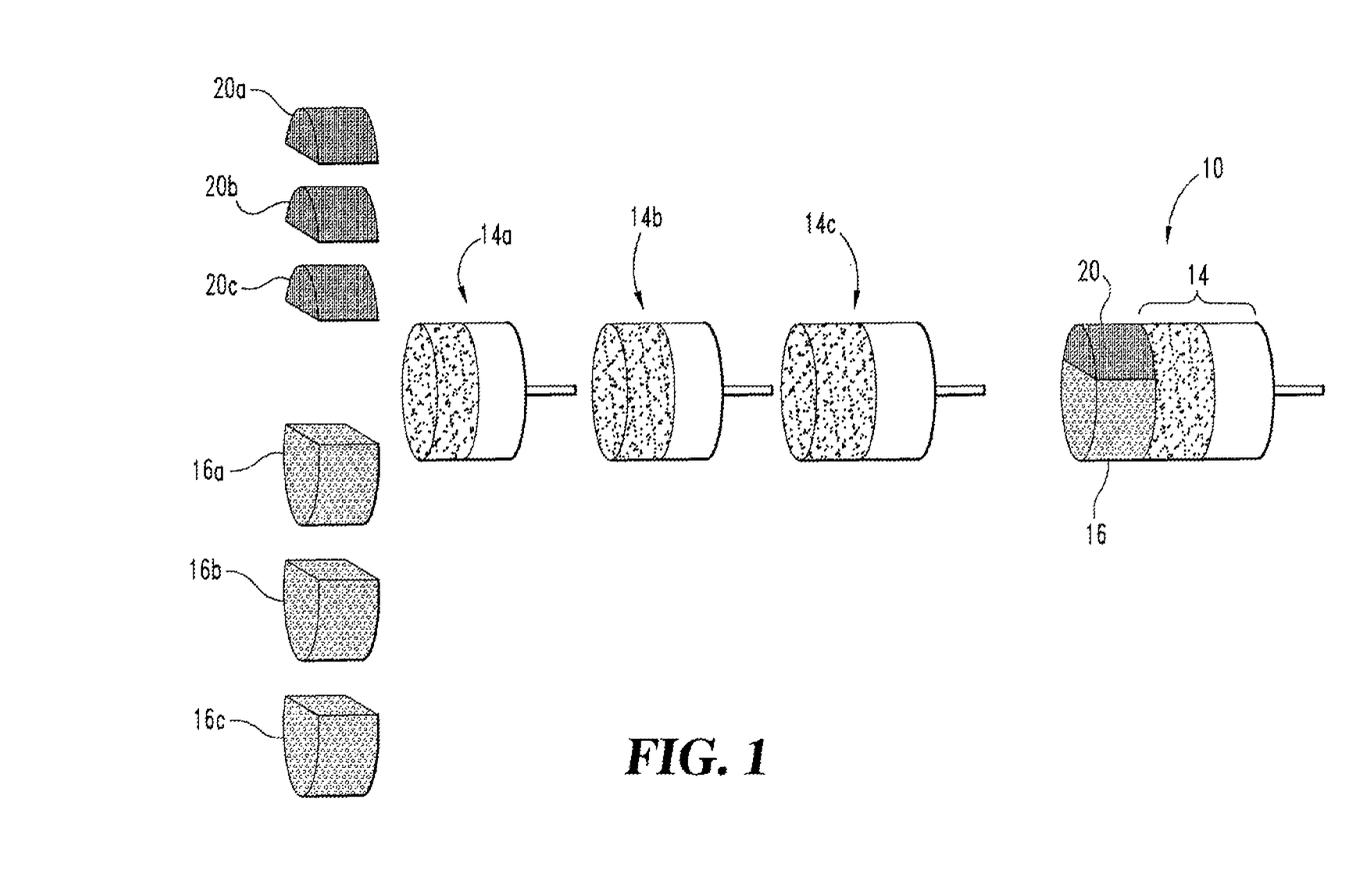
FIG. 1 is a schematic diagram showing a motor apparatus according to an embodiment.

With reference to FIG. 1, there is illustrated a motor apparatus 10 comprising a modular construction according to an exemplary embodiment. The motor apparatus 10 can comprise any suitable type motor, for example a brushless DC (BLDG) motor system, a fractional HP motor, among others, and can be used in any suitable application, for example in HVACR systems to drive one or more loads.

In the FIG. 1 embodiment, the motor apparatus 10 comprises three separate connectable and detachable modules including a motor core and driver section 14, a power supply section 16, and an external interface section 20. As will be described in greater detail below, the modules can be selected from module families comprising a plurality of compatible modules having different characteristics to allow flexibility, upgradeability, and or serviceability, in the configuration of the motor apparatus 10.

The motor core and driver section 14 includes the rotating machinery of the motor apparatus 10. The motor core and driver section 14 can comprise a family of modules, each operating at for example 310V, in which for example, one module 14a comprises a one-third HP motor core (⅓ HP+), another module 14b comprises a one-half HP motor core (½ HP+), and another module 14c comprises a one HP motor core (1 HP+). Each module of the motor core and driver section 14 can also be configured with electronic circuits that can convert DC power supply and power request signals into drive signals that can achieve different modes of operations and rotational directions of the motor.

The power supply section 16 can convert various AC single and poly phase, into DC voltage for use by the motor core and driver section 14. The power supply section 16 can comprise a family of modules in which for example, one module 16a comprises a 115 volts/230 volts 250 watts power supply (115/230 250 W+), another module 16b comprises a 115 volts/230 volts 375 watts power supply (115/230 375 W+), and another module 16c comprises a 115 volts/230 volts 750 watts power supply (115/230 750 W+).

The external interface section 20 can be configured to accept control signals from for example a user or other control source. The external interface section 20 can comprise a family of modules in which for example, one module 20a can comprise an interface having serial communicating (for example a physical communication layer RS485 using any suitable protocol including Climate Talk, IMC, etc.), for example in applications requiring a communicating motor, another module 20b can comprise for example a high voltage interface, and another module 20c can comprise for example an multi-tap variable speed interface. In one form, the external interface section 20 can provide courtesy control power signals to a user, and allow the user to configure the motor operation accordingly.

The modules, for example 14a-14c, 16a-16c, and 20a-20c, can be configured to be field detachable and field installable with respect to one another in any variety of combinations to provide a plurality of different operative assemblies. For example, in one modular motor construction application, the module 14a can be attached to the modules 16b and 20c. In one form, the modules can be configured to be field detachable and field installed, to allow a user to replace for example only the module that has failed, in a service scenario.

A family of modules can be provided such that the modules can be assembled in the field and/or at a manufacturer or assembly location. A family of modules can be configured to allow (or prevent) many different types of configurations. The modules can include one or more electrical attachment points that can enable the modules to be remote mounted, if necessary or desired. The modules can include an electrical coupling such as a cord or cable plugged in instead of the module. In one form, the modules 14a-14c, 16a-16c, and 20a-20c, can be configured so that one or modules may not be needed for operation of the motor apparatus 10 in a particular application.

Additionally or alternatively, the modularity of the motor apparatus 10 can be configured to allow evaluation of multiple design considerations in which, for example, one or more modules can be changed at a time, without having to change the entire platform, or a larger part of the platform, for instance other modules not relevant, or of negligible significance, to a particular design or desired operation of the motor apparatus 10.

Additionally or alternatively, the modularity of the motor apparatus 10 can be configured to allow upgrades to modules, for example by a user in the field, based on for example changes in regulations or the like.

Additionally or alternatively, the motor apparatus 10 can be configured to provide an indication (for example to a user) that function(s) of one or more of the modules are already in place. In one form, the indication can serve to indicate (for example to a user), that one or more modules do not require replacement and/or need not be ordered, thus avoiding unnecessary replacement and/or duplication of function.

As will be appreciated, the particular division of function in the modular motor construction can embody numerous combinations of functions and modularity for consideration in the construction of the motor apparatus 10.

Further, as will be appreciated, the FIG. 1 embodiment is only one manner of implementing a modular construction. Those skilled in the art will appreciate that other modular implementations and techniques may also or alternatively be employed.

In an embodiment, the motor apparatus 10 can be configured to provide the ability to upgrade each module according to a desired, or different, set of features for that particular module. In an additional or alternative embodiment, one module (for example module 16) can be configured to incorporate a first set of electronic functions, characteristic, and/or parameters, and another module (for example module 20) can be configured to incorporate another, different, set of electronic functions, to allow flexibility and adjustability in the electronic configuration of the motor apparatus 10. In an additional or alternative embodiment, one module (for example module 16) can be configured to incorporate a first set of mechanical functions, characteristic, and/or parameters, and another module (for example module 20) can be configured to incorporate another, different, set of mechanical functions, to allow flexibility and adjustability in the mechanical configuration of the motor apparatus 10.

In an additional or alternative embodiment, the external interface section 20 modules 20a-20c can be configured to provide different interfacing requirements without the need to change for example the motor core and driver section 14 modules 14a-14c when one of the modules 20a-20c is installed, or without an accompanying change in the performance of the motor.

In an additional or alternative embodiment, the motor core and driver section 14 modules 14a-14c can be configured to have corresponding increases in efficiencies without the need to change for example the external interface section 20 module 20a-20c of the motor as well, when the module 14a-14c is installed for such increase in efficiency.

As will be appreciated, the three separate connectable and detachable modules including the motor core and driver section 14, the power supply section 16, and the external interface section 20, of the motor apparatus 10 can be selected from module families that have different characteristics, thus allowing flexibility, upgradeability, and/or serviceability, in the configuration of the motor apparatus 10. The functionality of the motor apparatus 10 can thus be divided, for example, to allow various combinations of a particular motor core and driver module 14, a particular power supply module 16, and a particular external interface module 20, to achieve different types of applications, for example, an HVAC construction.

Figure 2:
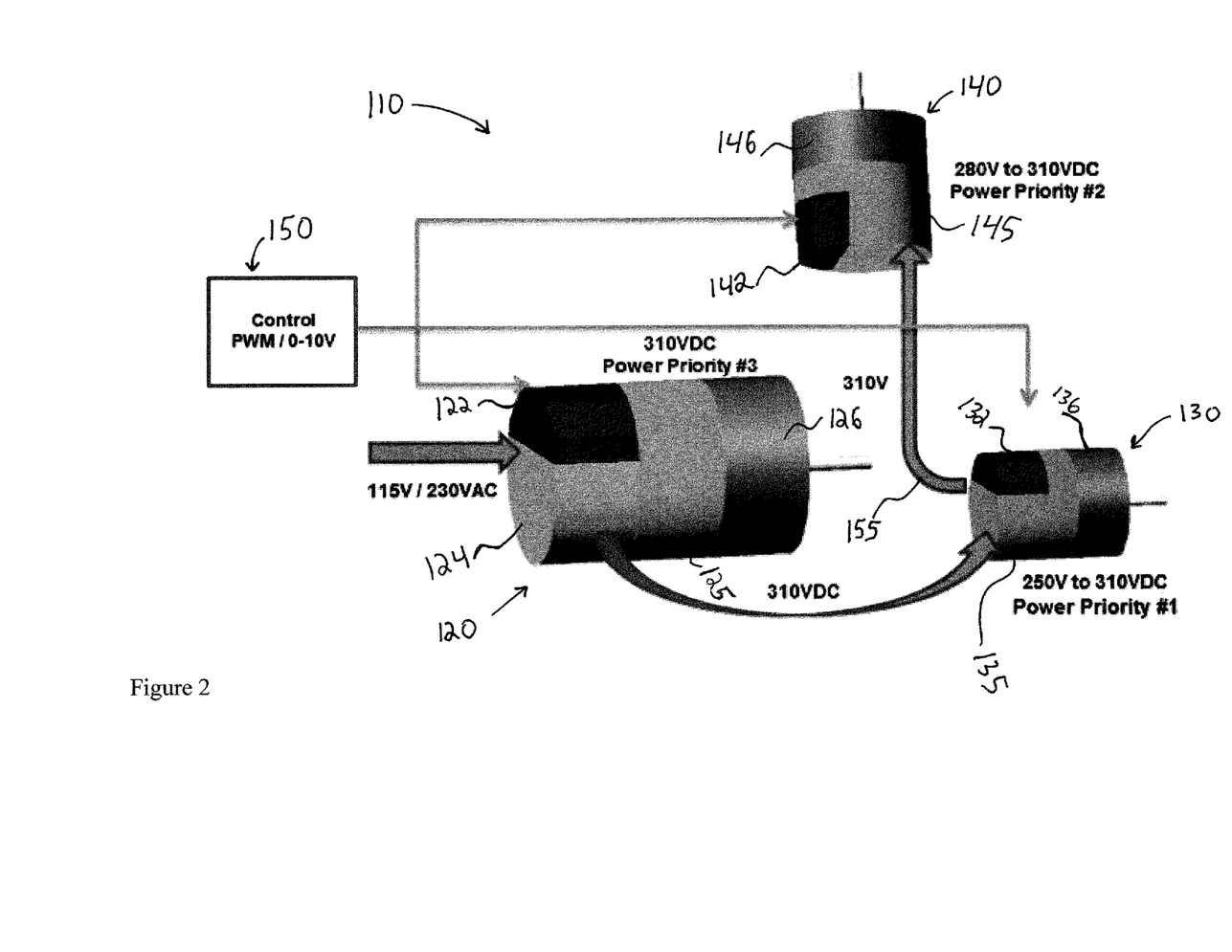
FIG. 2 is a schematic diagram showing a multiple motor power sharing system according to an embodiment.

With reference to FIG. 2, there is illustrated a multiple motor power sharing system 110 according to an embodiment. The multiple motor power sharing system 110 includes a plurality of motors 120, 130, and 140. It shall be appreciated that other embodiments may include greater or fewer numbers of motors. The system 110 is configured to allow two or more DC motors to be used, wherein not all motors have a power supply section such as an AC to DC power conversion circuit. As will be described in greater detail below, the components of the system 110 can be configured such that a master motor regulator is designed such that the other motors can continue to operate for example at full power while the master motor (or other select motors') power output is sacrificed; or alternatively, such that the auxiliary motors' output power is sacrificed while the master motor (or other motors') power is maintained.

Referring to FIG. 2, the multiple motor power sharing system 110 includes three motors 120, 130, and 140 that share power from an AC/DC converter of motor 120 which may output to a common DC buss 155. The motor 120 includes an external interface section 122, a power supply section in the form of an AC to DC converter 124, and a motor core 126 and driver section 125. It shall be appreciated that the motor core 126 and the driver section 125 may be configured as common or separate sections or modules. The motor 120 has an operating voltage of 310 VDC and is labeled Power Priority #3, and is configured to receive a 115 V/230 VAC input. It shall be appreciated that other embodiments may have different AC and DC operating voltages depending upon the various needs of different applications. The motor 130 includes an external interface section 132, a motor core 136, and a driver section 135. The motor 130 has an operating voltage of 250 V to 310 VDC and is labeled Power Priority #1. The motor 140 includes an external interface section 142, a motor core 146 and a driver section 145. The motors 120, 130 and 140 may utilize DC power from a common DC buss 155 which is supplied from the AC/DC converter of motor 120 in the illustrated embodiment.

In the illustrated embodiment, the motor 140 has an operating voltage of 280 V to 310 VDC and is labeled Power Priority #2. A motor control module 150, which can be for example a PWM controller or a 0 to 10 V proportional controller, can be configured to generate multiple pulse width modulated outputs to the motors 120, 130, and 140, as illustrated in FIG. 2. As will be appreciated, a common controller could be used or alternatively separate controllers can be used; for example, the motors 120, 130, and 140 could use separate controllers or the same controller can be used to generate different outputs for control. In one form, the same 0 to 10 controller can be used for a capacity signal and all three motors 120, 130, 140 can be configured to respond to that capacity signal in different ways; in another form, there can be three independent signals. As will also be appreciated, the multiple motor power sharing system 110 need not be limited to the number and configuration of motors 120, 130, and 140, shown in FIG. 2, and other embodiments are contemplated. Further, as will be described below, the multiple motor power sharing system 110 can be configured for system optimization for an AC powered multi-DC-motor application with a power sharing scheme applied for system flexibility and function prioritization.

One or more motors of a system such as that of the FIG. 2 multiple motor power sharing system 110, can be designed to have an optional power supply to convert AC to DC. This power supply, present on some motors in a system, for example the motor 120 of the FIG. 2 multiple motor power sharing system 110, can be configured to output a nominal voltage. Multiple motors without an AC to DC converter can be attached to the same DC buss 155. Additionally, multiple motors with an AC to DC converter can be attached to the same DC buss 155 and thereby receive power from two or more sources. For example, in the FIG. 2 multiple motor power sharing system 110, the motor 120 has an AC to DC converter 124 attached to DC buss 155, and the motors 130 and 140 without an AC to DC converter are attached to the DC buss 155.

The drive electronics of one or more of the motors can be calibrated to maintain power until for example a certain voltage drop is experienced, then to reduce output power smoothly. Further, the AC to DC converter element, for example the AC to DC converter 124 of the motor 120, can be regulated and managed to contribute power to the voltage buss 155, including the supply to the motor to which it is attached, for example the supply to the motor 120 in the FIG. 2 embodiment. For example, the AC to DC converter element can be regulated or managed up to a predetermined current limit, and as this current limit is achieved, the power supply(ies) can continue to contribute power, for example at a relatively constant level, to the voltage buss 155. In one form, the power supply or supplies can continue to contribute power until for example some lower limit is reached, at which point the power can drop off.

As will be appreciated, a multiple motor power sharing system such as the multiple motor power sharing system 110 illustrated in FIG. 2, can be configured to provide a method of power distribution that, when combined with intelligent power request from one or more of the motors, can result in an optimized system with low cost, high reliability, and predictable system operating and overload responses.

In certain embodiments, a multiple motor power sharing system can pair a DC motor/drive combination with other DC motors present in the system, arranged such that one or more motors can have a circuit to convert AC to DC and present this voltage supply on a DC bus, to which the same assembly's motor will be operated, as well as other external auxiliary motors (some with and some without the AC to DC converter).

In certain embodiments, the motors can be applied in a system where the maximum performance operation of two or more motors is mutually exclusive. In one form, the shared DC buss between motors can be operated at a nominal target voltage.

In certain embodiments, one or more of the DC motors can be managed or regulated, or in closed loop operation such that for example if there is a reduction in a target buss voltage, the motor regulation will increase the current draw to maintain the power output of the motor. In one form, the regulation of one or more of the motors can be calibrated such that the motor(s) will maintain design power down to a specific input voltage, at which point the motor(s) output power will decrease with further decreases in the buss voltage.

In an embodiment, the master motor(s) (that is, the motor(s) with the AC to DC power supply component, for example the AC to DC converter 124 of the motor 120 in the FIG. 2 embodiment) may have a different calibration than other motors in the system. Further, the power supplies in the system can be configured to be "pulled down" when overloaded, and maintain a desired power output, for example a constant power output, as the voltage continues to be pulled down. In one form, the voltage can continue to be pulled down to, for example, some point where the output will maintain a constant current.

In an embodiment, a multiple motor power sharing system such as that of the FIG. 2 embodiment, can be configured to specify different operating voltage ranges for each motor (below which the power will be reduced). In so doing, the system can be designed where different motors can have different power prioritization and natural performance linkages between motor groups can be achieved. For example, in the FIG. 2 embodiment, the power prioritization of the motors is motor 130 has first priority (Power Priority #1), motor 140 has second priority (Power Priority #2), and motor 120 has third priority (Power Priority #3). These relative power supply priorities may be managed by one or more controls which may include motor control PWM module 150. Such a system can be employed in any suitable application, for example, the system can comprise a packaged air conditioner system, where a blower motor, a condenser motor and a gas heat draft inducer reside in the system. The draft inducer motor and the condenser motor can be powered off a power supply on the blower motor. The draft inducer motor absolute power output can be configured to have a greater power prioritization function than for example the blower motor; as such, the blower motor can be calibrated to begin power take-down ahead of the draft inducer motor.

As will be appreciated, the multiple motor power sharing system 110 is one example of the manner by which the modularity scheme described above with respect to the FIG. 1 embodiment can be configured. For example, in regards to the FIG. 2 multiple motor power sharing system 110, the family of modules 14, 16, and 20 can be implemented for example such that with respect to the motor 120, the motor core and driver section 14 can include the motor core 126 and driver section 125, the power supply section 16 can include the AC to DC converter 124, and the external interface section 20 can include the external interface section 122. Similarly, with respect to the motor 130, the motor core and driver section 14 can include the motor core 136 and driver section 135, and the external interface section 20 can include the external interface section 132. Similarly, with respect to the motor 140, the motor core and driver section 14 can include the motor core 146 and driver section 145, and the external interface section 20 can include the external interface section 142.

In the FIG. 2 embodiment, the motor 120, which can be referred to as a master motor, is configured with a power supply section in the form of an AC to DC converter 124, whereas the motors 130 and 140, which can be referred to as auxiliary motors, do not have a power supply section and instead rely on the modularity scheme in which power is supplied by the power supply 124 of the motor 120. Thus, several motors 120, 130, and 140 are configured to receive DC power from one motor 120; and the power sharing scheme described with respect to the FIG. 2 embodiment provides the ability to prioritize the operation of one motor versus another motor; for example, if the DC voltage were pulled down, one motor would respond differently than another motor based on the prioritization. The same power supply 124 can be used to supply power to multiple motors 120, 130, and 140, and the power sharing system 110 can select among the motors. For example, in an HVAC system, motor 120 can comprise a blower motor, motor 140 can comprise a condenser fan motor, and the motor 130 can comprise a draft inducer motor 130. In one application, for example, it may be desirable or necessary to maintain the speed of the draft inducer motor 130, i.e. not allow the draft inducer motor 130 to slow down, so that the draft inducer motor is prioritized over other motors. In other applications, for example, it may be desirable or necessary to prioritize the condenser motor 130.

As will be appreciated, a multiple motor power sharing system such as that of the FIG. 2 embodiment can be applied in any system in which multiple AC powered brushless DC motors are present in the same system. Further, the system need not have an AC to DC converter present at each motor in the system. Further, an AC to DC converter, if present at a motor in the system, need not necessarily be sized for the full load output of that motor in the system. Further, for systems in which the motors are not required to operate at the same time, the multiple motor power sharing system can be configured to employ an AC to DC converter's(s') capacities in a shared manner, as described herein.

The multiple motor power sharing system can comprise a system in which a motor separated from an inverter drive system is constructed such that excess capacity from the AC to DC portion of the inverter drive system is available to power smaller auxiliary motors. The multiple motor power sharing system can be designed and managed so that there is enough capacity for each system or programmed so that the system will not overload the AC to DC supply.

Figure 3:
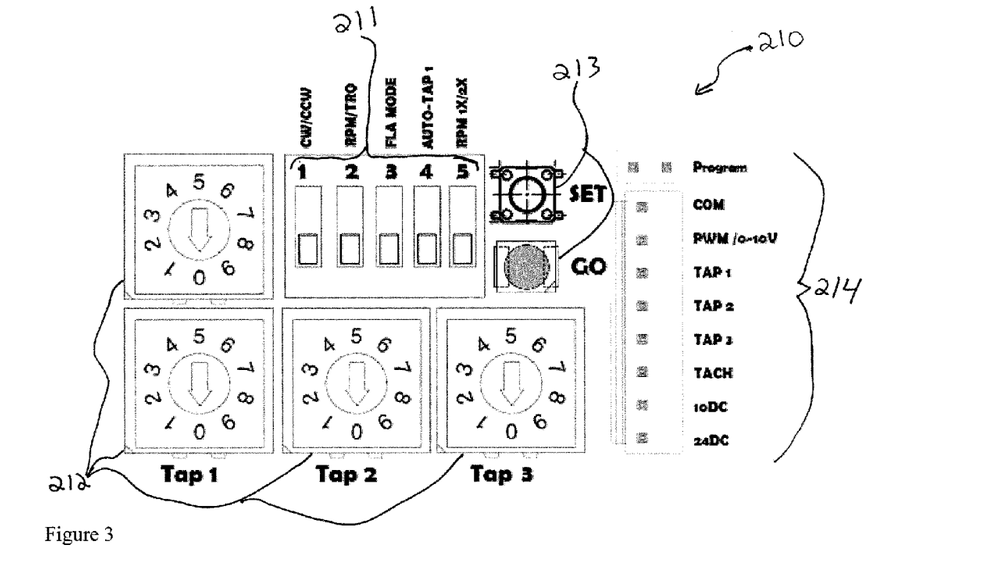
FIG. 3 is a schematic diagram showing a motor performance configuration module according to a first embodiment.
Figure 4:
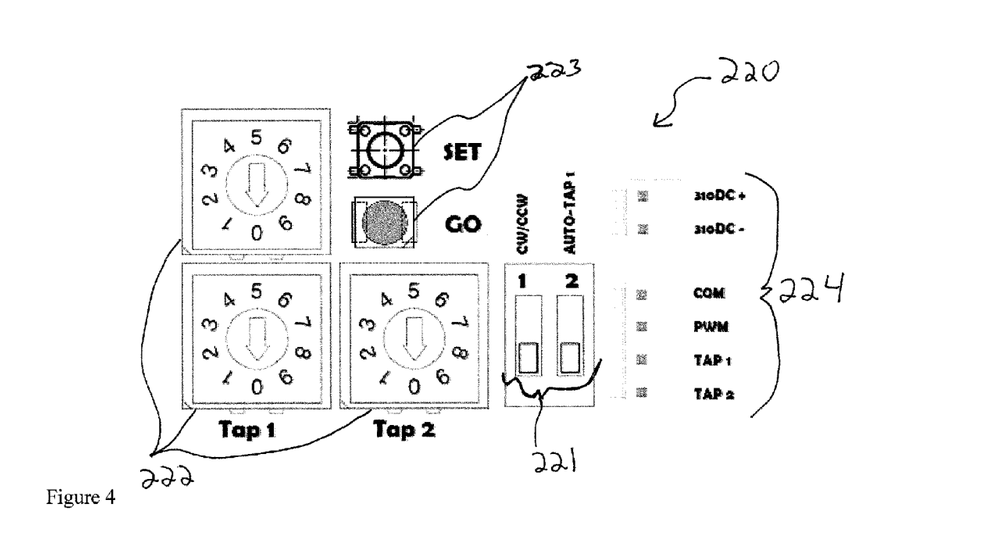
FIG. 4 is a schematic diagram showing a motor performance configuration module according to a second embodiment.

With reference to FIG. 3, there is illustrated a motor performance configuration module 210 for performance configuration of a motor according to an embodiment. FIG. 4 also shows a motor performance configuration module 220 according to an embodiment. The motor performance configuration module 210, 220, which is also referred to herein as a performance scaling module 210, 220, can be configured for module-on-board capability, and/or remote mount capability, with respect to the motor. As will be described in greater detail below, the motor performance configuration module 210, 220 can provide an integrated or remote user interface method that allows a high reliability graphical performance configuration and scaling of motor performance without the use of a computer on the motor. Further, as described herein, the method of setting the performance of the motor can be protected by a method that retains the settings to ensure that the settings are not accidentally changed by environmental conditions. The module 210, 220, although described herein in the context of configuration of a motor, need not be limited as such, and other embodiments are contemplated. The module 210, 220 can be used for the configuration of separate motors and drive combinations, and integrated drive combinations, for example. Further, it will be appreciated that either or both of the motor performance configuration modules 210, 220 can be utilized as one or more of the external interface modules 20 of the family of modules described with respect to the FIG. 1 motor apparatus, as will become apparent from the description herein. Still further, it will be appreciated that either or both of the motor performance configuration modules 210, 220 can be utilized as one or more of the external interface modules 122, 132, 142 of the respective motors 120, 130, 140 described with respect to the FIG. 2 multiple motor power sharing system 110.

Referring to FIGS. 3 and 4, the motor performance configuration module 210, 220 includes switches 211, 221, dials 212, 222 which may actuate one or more encoders, and/or potentiometers, buttons 213, 223, input/output connectors 214, 224, and a controller. In other embodiments, motor performance configuration module 210, 220 includes other user interface configurations including a variety of additional and/or alternate switches, dials, encoders, potentiometers, buttons, input/output connectors and/or other devices.

The motor performance configuration module 210 includes features for example three tap with default (e.g. 24 V), variable speed or variable torque, current limiting, 10 VDC/24 VDC supply, and speed range (1×/2×). The motor performance configuration module 220 includes features for example two tap (e.g. 24V), and variable speed. The motor performance configuration modules 210, 220 can include other features depending on the application involved, for example, as described herein with respect to the FIG. 1 embodiment, serial communicating (for example a physical communication layer RS485 using any suitable protocol including Climate Talk, IMC, etc.) or constant flow (pressure algorithm), or constant air volume, or variable speed or variable torque, along with a tap for constant flow scaling capabilities.

Motor performance configuration modules 210, 220 allow a user to adjust and/or set the performance parameters of the motor through one or more input devices. In one form, the switches comprise electro-mechanical switches, although other switches are contemplated. The performance parameters can include any parameters that are necessary or desirable for configuration of a particular motor application, such as speed, torque, variable speed operating ranges, and rotation direction. The controller can comprise for example one or more microprocessor circuits, to process configuration performance instructions provided by the user via the switches, encoders, and/or potentiometers. The module 210, 220 is configured to output signals to the rest of the motor assembly based on for example the non-volatile settings that are stored on the microprocessors present in the interface assembly of the module 210, 220. The module 210, 220 can be configured to be separable from the motor and extended with a cable to allow the motor assembly to be commissioned, and the configuration changed, then reattached to the motor for final assembly. As will be appreciated, the module 210, 220 can allow a user to set a performance response desired of a motor, or a motor drive combination unit, without the use of any specialized tools or computer equipment.

In an embodiment, the motor performance configuration module 210, 220 can further include a momentary switch or similar device or assembly. Once the performance settings are changed via the dials, such as the switches, encoders, and/or potentiometers, the momentary switch can serve to confirm the settings, or a portion of the settings. With such confirmation, the momentary switch will allow accidental changes of the switches or dials, for example by human intervention, to be rejected, or failure of the switches due to external influences, for example by environmental impact or degradation, to be rejected. In one form, if the configuration switches are changed, but the momentary "program" or "set" button is not depressed for a period of time, for example a predetermined period of time, the settings will not be accepted.

In an embodiment, the motor performance configuration module 210, 220 can be configured with an indicator, for example a visual indicator, that serves to indicate whether the internal configuration on the microprocessor matches the configuration of the switches, encoders and/or potentiometers. Thus, in one form, for example, the momentary switch or similar device can provide a method that allows a setting to be "accepted" by a processing unit, and the indicator can be provided to show that the settings have been accepted, and/or to indicate the settings of the switches, dials and/or encoders are not in sync with the onboard setting. As illustrated in FIGS. 3 and 4, the indicator may be provided as an illuminatible button labeled "GO" which may change illumination states (e.g., turning on/off, or changing color, intensity or flashing states) to indicate that the unit is ready for operation and accept user input to initiate operation.

In an embodiment, the motor performance configuration module 210, 220 can be configured with a connector or other facility that will allow a background configuration of the microprocessor for convenient non-manual configuration download. A factory configuration can be recalled by a particular setting on the control assembly. In one form, a method can be provided to allow factories to download a configuration to the motor that will be invoked if the switches are preset to a particular configuration. As will be appreciated, the module 210, 220 and its associated method can protect against accidental changes of the configuration of the motor, by human intervention or by environmental impact or degradation on the switches, encoders or potentiometers.

In an embodiment, the performance scaling module 210, 220 allows flexibility to remote mount the module 210, 220, or mount the module 210, 220 on the motor.

The motor performance configuration module 210, 220 can be used for performance configuration of motors, separate motors and drive combinations, and integrated drive combinations, to name a few. In one form, the module 210, 220 can be used to replace an existing motor's motor performance configuration apparatus or method; for example, the module 210, 220 can be used to replace a motor performance configuration technique that employs multiple taps and/or a communication port for downloading a specific performance configuration via use of a computer software and hardware tool.

As will be appreciated, with respect to performance configurability, the graphical and high reliability interface is configured to remotely set the motor. In an embodiment in which there are multiple families of modules on a motor, one of the family of modules can be held steady as the remaining modules are changed. This can be repeated for the other modules as well, as desired or necessary. In one form, a single external interface module can be used across an entire family of assemblies. Likewise, a single power supply can be used across an entire family of assemblies, for example, a high-power power supply section can be used in conjunction with a low power motor core and driver section.

In regards to the modularity of the interface modules, in addition to the segmentation of the functionality of the modules, there is also provided a group, or packet, of signals that are communicated from module to module, for example, in a predetermined format. As will be described in greater detail below, the group or packet of signals can facilitate a proportional operation.

In an embodiment, the motor core and driver module can be configured to receive a power supply DC voltage (e.g. 310 V) and a proportional DC signal, for example, 0 to 10 V. The motor core and driver module 125 can be configured to receive a power request for example of 0 to 100% of motor torque or 0 to 100% of motor RPM. The external interface module 122 can be configured to receive a user request, for example, for a high speed motor output, a medium speed motor output, or a low speed motor output, and to arbitrate the request against a predetermined high speed, predetermined medium speed, or predetermined low speed, respectively. As a result, the external interface module 122 determines a scaling function of 0 (e.g. off) to 10 (e.g. max of either torque or RPM) signal. Thus, if the user has configured the high speed to be 50% of torque on the user interface, and the requested speed is high speed, then the external interface module 122 will output 5 volts to the motor core and driver module. The motor core and driver module remains normalized in its operations, Thus, the group, or packet, of signals that are communicated between and/or among the modules provide proportional operation.

In one form, the proportional operation can be a proportional RPM mode. In another form, the proportional operation can be a proportional torque mode. In an embodiment, a pin configuration of the motor core and driver module can be associated with a mode of operation such that, for example, if a common pin is shorted then operation will be in the proportional RPM mode, and if the common pin is not shorted, then operation will be in the proportional torque mode. By way of example, for a proportional DC signal of 0 to 10, if a motor is capable of 100 inch pounds of torque, and a 10 volt signal is provided and common pins are shorted, then the motor will provide 100 inch pounds of torque. If a 10 volt signal is provided and the common pins are not shorted, the motor will provide the maximum RPM. Thus the same signal can provide either proportional RPM control or proportional torque control depending on whether the common pins are shorted. In another form the motor can rotate in a clockwise direction as well as being able to rotate in a counter-clockwise direction. In an embodiment, a pin configuration of the motor core and driver module can be associated with a mode of operation such that, for example, if a common pin is shorted then rotation will be in a clock wise direction and if the common pin is not shorted, then rotation will be in a counter to clockwise direction. In another form, the motor core and driver module will provide facility to provide back to the interface module, or to other external systems, a tachometer signal to indicate the speed of rotation of the motor. In another embodiment the tachometer signal can be used by the interface module to be an input to control algorithms to maintain certain system performance parameters. In another embodiment once such parameter could be a constant airflow through a blower system.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. A kit comprising:
a plurality of motor core and driver modules including at least two motor core and driver modules with different electrical characteristics;
a plurality of motor power supply modules including at least two motor power supply modules with different electrical characteristics; and
a plurality of external interface modules including at least two external interface modules with different electrical characteristics;
wherein the motor core and driver modules, the motor power supply modules, and the external interface modules are structured to be selectably coupleable and decoupleable with one another to provide a plurality of different assemblies that are structurally and electrically separate from one another, each of the plurality of different assemblies comprising a common set of electrical interconnections including a first electrical interconnection between the power supply module and the motor core and driver module of each assembly, a second electrical interconnection between the external interface module and the motor core and driver module of each assembly, and a third electrical interconnection between the power supply module and the external interface module of each assembly, wherein the voltage of the first electrical interconnection is greater than the voltage of the second electrical interconnection.

2. The kit of claim 1, further comprising an electric motor coupled with the motor core and driver module of at least one of the assemblies.

3. The kit of claim 1, wherein the plurality of motor core and driver modules comprises modules having different horsepowers.

4. The kit of claim 1, wherein the plurality of motor core and driver modules are configured with circuitry for converting DC power supply and power request signals into drive signals for driving the motor core in different modes of operations and rotational directions.

5. The kit of claim 1, wherein the plurality of motor power supply modules are structured to convert AC single and poly phase into DC voltage.

6. The kit of claim 1, wherein the first low voltage interconnection of each assembly is structured to transfer proportional torque or speed information and rotational direction information between the external interface module and the motor core and driver module of each assembly.

7. The kit of claim 1, wherein the second low voltage interconnection is structured to transfer power line input information between the power supply module and the external interface module of each assembly.

8. The kit of claim 1, wherein one of the assemblies is configured to provide a first set of mechanical functions, and another of the assemblies is configured to incorporate another, different, set of mechanical functions.

9. The kit of claim 1, comprising
a first motor drivably coupled with a first one of the assemblies;
a second motor drivably coupled with a second one of the assemblies; and
a third motor drivably coupled with a third one of the assemblies;
wherein at least two of the first, second and third assemblies utilize a common power supply module.

10. The kit of claim 1, wherein the voltage of the first electrical interconnection is greater than the voltage of the third electrical interconnection.

11. The kit of claim 1, wherein the third electrical interconnection comprises a multi-tap interface.

12. The kit of claim 1, wherein the voltage of the first electrical interconnection is at least two times the voltage of the second electrical interconnection.

13. The kit of claim 1, wherein the second and third electrical interconnection are class 2 electrically isolated interconnections.

14. A multiple motor power sharing system comprising:
a plurality of motors, wherein at least one of the motors includes a motor drive system and an AC to DC power circuit, and at least another one of the motors includes a motor drive system but not an AC to DC power circuit;
wherein the plurality of motors are configured to share power from the AC to DC power circuit of the at least one of the motors including the AC to DC power circuit;
wherein at least one of the motors includes drive electronics configured to regulate the AC to DC power circuit to distribute the shared power to the plurality of motors,
wherein at least one of the motors are configured to run at a reduced voltage to maintain full power output while the remaining motors incur a drop off in power, and
wherein the system further comprises a DC buss and the AC to DC power circuit is configured to supply the shared power to the plurality of motors via the DC buss.

15. The multiple motor power sharing system of claim 14, in which each motor drive system includes a motor core and a driver section.

16. The multiple motor power sharing system of claim 14, in which the plurality of motors includes a master motor and at least one auxiliary motor, wherein the drive electronics are configured to regulate the AC to DC power circuit to sacrifice power to the master motor in order to maintain power to the at least one auxiliary motor or to sacrifice power to the at least one auxiliary motor in order to maintain power to the master motor.

17. The multiple motor power sharing system of claim 14, wherein a plurality of motors each include an AC to DC power circuit, and are attached to the DC buss, and wherein at least one of the motors is configured to receive power from two or more AC to DC power circuits.

18. The multiple motor power sharing system of claim 14, wherein the drive electronics are configured to regulate the AC to DC power circuit up to a predetermined current limit at which the AC to DC power circuit supplies power at a constant level to the DC buss.

19. The multiple motor power sharing system of claim 14, wherein the drive electronics are configured to maintain power until a predetermined voltage drop is experienced, then to reduce output power.

20. The multiple motor power sharing system of claim 14, wherein the drive electronics are configured to regulate one or more of the plurality of motors such that if there is a reduction in a target buss voltage, the drive electronics increases current draw to maintain power output of the one or more of the plurality of motors.

21. The multiple motor power sharing system of claim 14, in which the plurality of motors are configured to have different power prioritization.

22. The multiple motor power sharing system of claim 21, wherein the plurality of motors includes a first motor having a first priority and a second motor having a second priority, and further including a motor control PWM module configured to manage the power prioritization.

23. The multiple motor power sharing system of claim 21, wherein the plurality of motors includes a blower motor, a condenser motor, and a draft inducer motor,
wherein the blower motor includes the motor drive system and the AC to DC power circuit, and the draft inducer motor and the condenser motor each include a motor drive system and are configured to be powered off the AC to DC power circuit of the blower motor;
wherein the draft inducer motor is configured to have a power output having a greater power prioritization function than the power output of the blower motor.

24. The multiple motor power sharing system of claim 23, wherein the blower motor is configured to be calibrated to begin a power take-down ahead of the draft inducer motor.

25. A motor apparatus comprising:
a motor;
a performance configuration module selectively attachable to the motor, the performance configuration module including a user interface configured with one or more input devices for adjusting the performance parameters of the motor; and
a controller for processing configuration performance instructions provided by the input devices;
wherein the performance configuration module further includes a momentary switch configured to confirm one or more of the settings of the input devices and configured to determine whether a setting can be accepted by the controller.

26. The motor apparatus of claim 25, wherein performance parameters are stored in a microprocessor memory.

27. The motor apparatus of claim 25, wherein the input devices comprise one or more of switches, encoders, potentiometers, buttons, and input connectors.

28. The motor apparatus of claim 25, wherein the performance parameters comprise one or more of motor speed, torque, variable speed operating ranges, and rotational direction.

29. The motor apparatus of claim 25, wherein performance configuration module is configured to be separable from the motor and extended with a cable.

30. The motor apparatus of claim 25, wherein the momentary switch is configured to allow input device changes when set, and to reject input device changes when not set.

31. The motor apparatus of claim 25, wherein the performance configuration module includes an indicator configured to indicate whether the internal configuration of the controller matches the configuration of the input devices.

32. The motor apparatus of claim 25, further comprising an auxiliary motor, and wherein the performance configuration module is configured to adjust the performance parameters of the auxiliary motor.

33. The motor apparatus of claim 25, wherein the performance configuration module is configured to communicate with the motor and other motor apparatuses via a group of signals having a predetermined format.

34. The motor apparatus of claim 33, wherein the group of signals facilitate a proportional operation.

35. The motor apparatus of claim 34, wherein the proportional operation comprises one or more of proportional speed mode or proportional torque mode.

* * * * *